United States Patent [19]

Reeve, III

[11] Patent Number: 4,730,345
[45] Date of Patent: Mar. 8, 1988

[54] VESTIGIAL SIDEBAND SIGNAL DECODER

[75] Inventor: Howard C. Reeve, III, Methuen, Mass.

[73] Assignees: American Telephone and Telegraph Company, New York, N.Y.; Bell Telephone Laboratories, Incorporated, Murray Hill, N.J.

[21] Appl. No.: 848,254

[22] Filed: Apr. 4, 1986

[51] Int. Cl.[4] .............................................. H03D 1/24
[52] U.S. Cl. ...................................... 375/77; 328/165
[58] Field of Search ..................... 375/43, 77, 102, 39; 455/295; 328/165; 343/361, 362; 342/361, 362

[56] References Cited

U.S. PATENT DOCUMENTS

| | | | |
|---|---|---|---|
| 3,443,229 | 5/1969 | Becker | 370/20 |
| 3,735,266 | 5/1973 | Amitay | 370/6 |
| 4,076,956 | 2/1978 | Dogliotti | 375/82 |
| 4,112,370 | 9/1978 | Monsen | 375/14 |
| 4,220,923 | 9/1980 | Pelchat et al. | 455/295 |
| 4,367,555 | 1/1983 | Namiki et al. | 375/11 |
| 4,577,330 | 3/1986 | Kavehrad | 455/295 |
| 4,592,072 | 5/1986 | Stewart . | |
| 4,606,054 | 8/1986 | Amitay et al. | 455/295 |

OTHER PUBLICATIONS

U.S. patent application Ser. No. 835,265; filed 03/03/86; Peter D. Karabinis Case 11; "Suppressed Double-Sideband Communication System".

Primary Examiner—Robert L. Griffin
Assistant Examiner—Stephen Chin
Attorney, Agent, or Firm—David R. Padnes

[57] ABSTRACT

A technique for decoding a vestigial sideband signal formed from a double-sideband signal having modulated quadrature-related carrier signals is disclosed. Within the receiver, the vestigial sideband signal is demodulated into a pair of received signals. Each of these received signals comprises a data signal which has been distorted by the double-sideband to vestigial sideband transformation. Pursuant to the present invention, each data signal is recovered in response to the associated received signal and the other data signal. Advantageously, the disclosed technique reduces the bandwidth required to transmit a given amount of information in systems which transmit modulated quadrature-related carrier signals.

15 Claims, 9 Drawing Figures

FIG.3

| $I_E(kT) = -6$ | | | $I_E(kT) = +6$ | | |
|---|---|---|---|---|---|
| $q((k-1)T)$ | $i(kT)$ | $q((k+1)T)$ | $q((k-1)T)$ | $i(kT)$ | $q((k+1)T)$ |
| -3 | -3 | 3 | 3 | 3 | -3 |

| $I_E(kT) = -5$ | | | $I_E(kT) = +5$ | | |
|---|---|---|---|---|---|
| $q((k-1)T)$ | $i(kT)$ | $q((k+1)T)$ | $q((k-1)T)$ | $i(kT)$ | $q((k+1)T)$ |
| -3 | -3 | 1 | 1 | 3 | -3 |
| -1 | -3 | 3 | 3 | 3 | -1 |

| $I_E(kT) = -4$ | | | $I_E(kT) = +4$ | | |
|---|---|---|---|---|---|
| $q((k-1)T)$ | $i(kT)$ | $q((k+1)T)$ | $q((k-1)T)$ | $i(kT)$ | $q((k+1)T)$ |
| -3 | -3 | -1 | -1 | 3 | -3 |
| -3 | -1 | 3 | 1 | 3 | -1 |
| -1 | -3 | 1 | 3 | 1 | -3 |
| 1 | -3 | 3 | 3 | 3 | 1 |

| $I_E(kT) = -3$ | | | $I_E(kT) = +3$ | | |
|---|---|---|---|---|---|
| $q((k-1)T)$ | $i(kT)$ | $q((k+1)T)$ | $q((k-1)T)$ | $i(kT)$ | $q((k+1)T)$ |
| -3 | -3 | -3 | -3 | 3 | -3 |
| -3 | -1 | 1 | -1 | 3 | -1 |
| -1 | -3 | -1 | 1 | .1 | -3 |
| -1 | -1 | 3 | 1 | 3 | 1 |
| 1 | -3 | 1 | 3 | 1 | -1 |
| 3 | -3 | 3 | 3 | 3 | 3 |

| $I_E(kT) = -2$ | | | $I_E(kT) = +2$ | | |
|---|---|---|---|---|---|
| $q((k-1)T)$ | $i(kT)$ | $q((k+1)T)$ | $q((k-1)T)$ | $i(kT)$ | $q((k+1)T)$ |
| -3 | -1 | -1 | -3 | 3 | -1 |
| -3 | 1 | 3 | -1 | 1 | -3 |
| -1 | -3 | -3 | -1 | 3 | 1 |
| -1 | -1 | 1 | 1 | 1 | -1 |
| 1 | -3 | -1 | 1 | 3 | 3 |
| 1 | -1 | 3 | 3 | -1 | -3 |
| 3 | -3 | 1 | 3 | 1 | 1 |

FIG. 4

| $I_E(kT) = -1$ | | | $I_E(kT) = +1$ | | |
|---|---|---|---|---|---|
| $q((k-1)T)$ | $i(kT)$ | $q((k+1)T)$ | $q((k-1)T)$ | $i(kT)$ | $q((k+1)T)$ |
| -3 | -1 | -3 | -3 | 1 | -3 |
| -3 | 1 | 1 | -3 | 3 | 1 |
| -1 | -1 | -1 | -1 | 1 | -1 |
| -1 | 1 | 3 | -1 | 3 | 3 |
| 1 | -3 | -3 | 1 | -1 | -3 |
| 1 | -1 | 1 | 1 | 1 | 1 |
| 3 | -3 | -1 | 3 | -1 | -1 |
| 3 | -1 | 3 | 3 | 1 | 3 |

| $I_E(kT) = 0$ | | |
|---|---|---|
| $q((k-1)T)$ | $i(kT)$ | $q((k+1)T)$ |
| -3 | 1 | -1 |
| -3 | 3 | 3 |
| -1 | -1 | -3 |
| -1 | 1 | 1 |
| 1 | -1 | -1 |
| 1 | 1 | 3 |
| 3 | -3 | -3 |
| 3 | -1 | 1 |

FIG. 6

| INPUT | | OUTPUT | |
|---|---|---|---|
| CORRECT VALUE OF: | | ESTIMATES OF: | |
| I (kT) | q((k-1)T) | i(kT) | q((k+1)T) |
| -6 | -3 | -3 | 3 |
| -5 | -3 | -3 | 1 |
| ↓ | -1 | -3 | 3 |
| -4 | -3 | C | A |
| ↓ | -1 | -3 | 1 |
| ↓ | 1 | -3 | 3 |
| -3 | -3 | C | B |
| ↓ | -1 | C | A |
| ↓ | 1 | -3 | 1 |
| ↓ | 3 | -3 | 3 |
| -2 | -3 | D | A |
| ↓ | -1 | C | B |
| ↓ | 1 | C | A |
| ↓ | 3 | -3 | 1 |
| -1 | -3 | D | B |
| ↓ | -1 | D | A |
| ↓ | 1 | C | B |
| ↓ | 3 | C | A |
| 0 | -3 | E | A |
| ↓ | -1 | D | B |
| ↓ | 1 | D | A |
| ↓ | 3 | C | B |
| 1 | -3 | E | B |
| ↓ | -1 | E | A |
| ↓ | 1 | D | B |
| ↓ | 3 | D | A |
| 2 | -3 | 3 | -1 |
| ↓ | -1 | E | B |
| ↓ | 1 | E | A |
| ↓ | 3 | D | B |
| 3 | -3 | 3 | -3 |
| ↓ | -1 | 3 | -1 |
| ↓ | 1 | E | B |
| ↓ | 3 | E | A |
| 4 | -1 | 3 | -3 |
| ↓ | 1 | 3 | -1 |
| ↓ | 3 | E | B |
| 5 | 1 | 3 | -3 |
| ↓ | 3 | 3 | -1 |
| 6 | 3 | 3 | -3 |

KEY

| INPUTS | | | OUTPUTS | |
|---|---|---|---|---|
| ESTIMATES OF: | | | CORRECT VALUE: | |
| $i((k-1)T)$ ON BUS 409 | $q(kT)$ ON BUS 408 | $q(kT)$ ON BUS 419 | $i((k-1)T)$ ON BUS 412 | $q(kT)$ ON BUS 411 |
| −3 | 3 | X | −3 | 3 |
| −3 | 1 | X | −3 | 1 |
| C ↓ | A ↓ | 3 | −1 | 3 |
|  |  | C | −3 | −1 |
|  |  | D | −3 | −1 |
|  |  | E | −1 | 3 |
|  |  | −3 | ? | ? |
|  | B ↓ | 3 | ? | ? |
|  |  | C | −3 | −3 |
|  |  | D | −1 | 1 |
|  |  | E | −1 | 1 |
|  |  | −3 | −3 | −3 |
| D ↓ | A ↓ | 3 | 1 | 3 |
|  |  | C | −1 | −1 |
|  |  | D | −1 | −1 |
|  |  | E | 1 | 3 |
|  |  | −3 | ? | ? |
|  | B ↓ | 3 | ? | ? |
|  |  | C | −1 | −3 |
|  |  | D | 1 | 1 |
|  |  | E | 1 | 1 |
|  |  | −3 | −1 | −3 |
| E | A | 3 | 3 | 3 |

KEY
 A=(−1,3)
 B=(−3,1)
 C=(−3,−1)
 D=(−1,1)
 E=(1,3)
 X= DON'T CARE
 ?= CAN'T HAPPEN

FIG.8

| INPUTS | | | OUTPUTS | |
|---|---|---|---|---|
| ESTIMATES OF: | | | CORRECT VALUE: | |
| i((k−1)T) ON BUS 409 | q(kT) ON BUS 408 | q(kT) ON BUS 419 | i((k−1)T) ON BUS 412 | q(kT) ON BUS 411 |
| E ↓ 3 3 | A ↓ B ↓ −1 −3 | C D E −3 3 C D E −3 X X | 1 1 3 ? ? 1 3 3 1 3 3 | −1 −1 3 ? ? −3 1 1 −3 −1 −3 |

KEY
A=(−1,3)
B=(−3,1)
C=(−3,−1)
D=(−1,1)
C=(1,3)
X= DON'T CARE
?= CAN'T HAPPEN

| q((k−1)T) | i(k+1) | q((k+1))T | $I_E(kT)$ |
|---|---|---|---|
| 1 | 1 | 1 | 1 |
| 1 | 1 | −1 | 2 |
| 1 | −1 | 1 | −1 |
| 1 | −1 | −1 | 0 |
| −1 | 1 | 1 | 0 |
| −1 | 1 | −1 | 1 |
| −1 | −1 | 1 | −2 |
| −1 | −1 | −1 | −1 |

VESTIGIAL SIDEBAND SIGNAL DECODER

TECHNICAL FIELD

The present invention relates to a digital communications system which transmits a vestigial sideband signal comprising modulated quadrature-related carriers.

BACKGROUND OF THE INVENTION

Digital communication systems utilize a myriad of modulation formats. In one commonly-used format, data signals modulate quadrature-related carrier signals. This type of modulation has a variety of names, such as phase shift keying (PSK), quadrature amplitude modulation (QAM), and amplitude and phase shift keying (APSK). The information conveyed by the data signal is, of course, virtually limitless and can include voice, video, facsimile and the like. Moreover, the transmission channel carrying the modulated carriers is also not limited and, at present, may include air, wire or lightguide.

A problem in practically all communications systems is that the transmission channel is band-limited. That is, there is a finite frequency interval which can be used to convey information. This limitation arises because of system and/or device requirements. While the severity of this problem does vary from system to system, it still can be said that the ability to convey still more information in a given frequency interval would be highly desirable.

One technique to increase the information-carrying capacity of a digital system transmitting modulated quadrature-related carriers is to increase the number of permissible modulation states. An example of this technique is exemplified by the design and deployment of 64 QAM systems in lieu of 16 QAM systems in applications requiring greater capacity. The problem with this technique is that the change in the number of modulation states requires, at least, the design and development of new modulators and demodulators. This effort is often expensive and the resulting equipment, at times, can not be retrofitted into operational systems without great expense.

Another technique to increase system capacity has been to utilize single-sideband or vestigial sideband signals instead of double-sideband signals. This technique is rather simple to implement and has been routinely used in formats which modulate a single carrier signal. Unfortunately, this technique has not been used for systems utilizing quadrature-related carriers because the filtering of the double-sideband signal into a vestigial or single-sideband signal renders the data signal unintelligible.

SUMMARY OF THE INVENTION

The present invention addresses the problem of intelligently decoding a double-sideband QAM signal after it has been filtered into a vestigial sideband signal. Within the receiver, the vestigial sideband signal is demodulated into a pair of received signals. Each of these received signals includes one of the two data signals carried by the double-sideband QAM signal along with an interfering signal created by the double-sideband to vestigial sideband filtering process. In accordance with the present invention, each data signal is recovered in response to its associated received signal and the other data signal. Advantageously, this technique can be readily adapted for different modulation formats.

BRIEF DESCRIPTION OF THE DRAWING

FIGS. 3 and 4 set forth, in summary form, the interference effects produced by the double-sideband to vestigial sideband transformation;

FIGS. 6 and 7 show the mapping function provided by I PROM 403 in FIG. 4;

FIG. 8 shows the mapping function provided by I PROM correct 410 in FIG. 4; and

DETAILED DESCRIPTION

Figure 1:
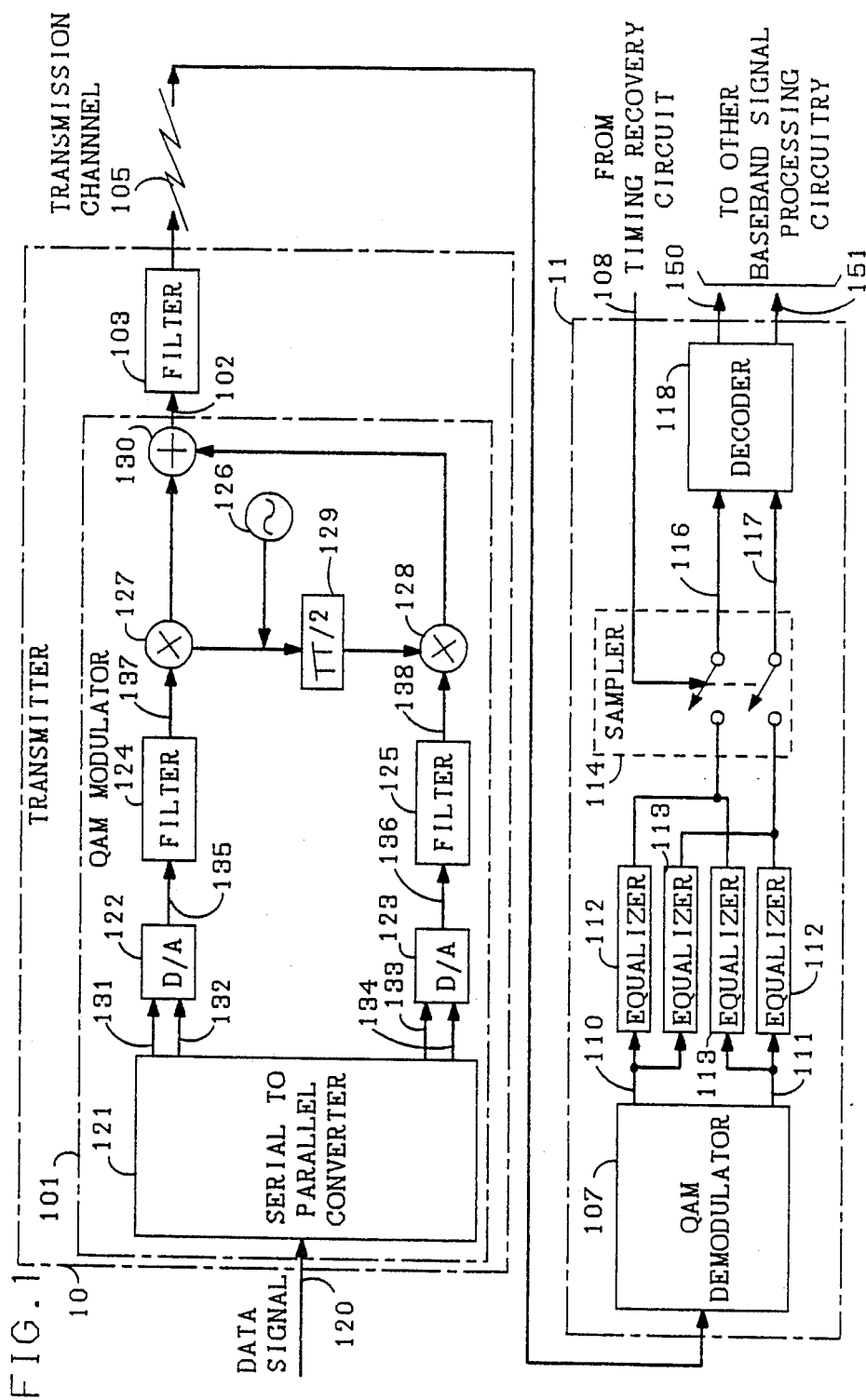
FIG. 1 is a block schematic diagram of a communications system which incorporates the present invention.

FIG. 1 shows an exemplary 16 QAM, communications system which incorporates the present invention. (The term 16 in the designation 16 QAM refers to the number of transmitted signal states in the QAM format.) At transmitter 10, a digital data signal on lead 120 is coupled to a modified QAM modulator 101. Within modulator 101, serial-to-parallel converter 121 spreads successive bits of the data signal on lead 120 over four paths 131, 132, 133, and 134, respectively. Digital-to-analog (D/A) converter 122 quantizes the signals appearing on leads 131 and 132 into a number of signal voltages which appear on lead 135. For the case of 16 QAM modulation, 4 signal voltages appear on lead 135. Similarly, D/A converter 132 quantizes the signals on leads 133 and 134 into a number of signal voltages which are coupled to lead 136. Multipliers 127 and 128 receive the signal voltages on leads 135 and 136 after they are respectively smoothed by Nyquist filters 124 and 125. Multiplier 127 modulates the amplitude of a carrier signal generated by oscillator 126 with the signals on lead 135 after filtering. In similar fashion, multiplier 128 modulates the amplitude of a second carrier signal with the signals on lead 136 after smoothing by Nyquist filter 125. The second carrier signal supplied to multiplier 128 is generated by shifting the carrier signal generated by oscillator 126 by minus $\pi/2$ radians via phase shifter 129. Hence, the pair of carrier signals supplied to multipliers 127 and 128 are in phase quadrature to one another and the products provided by multipliers 128 and 129 are each double-sideband signals. Summer 130 then adds the products provided by multipliers 128 and 129 and outputs this sum, also a double-sideband signal onto lead 102.

Reviewing the signal processing provided by the transmitter components discussed thus far, it can be said that these components modulate quadrature-related carriers with a pair of data signals, wherein one data signal comprises the signals appearing on leads 131,132 or 135 or 137 while the other data signal comprises the signals appearing on leads 133,134 or 136 or 138. In addition, if we select the number and permitted values of the signal voltages provided by D/A converters 122 and 123, we can graphically depict all of the possible combinations of transmitted carrier signal amplitudes which represent the data signal on a Cartesian coordinate plot. Such a plot is commonly referred to as a signal space diagram.

Figure 2:
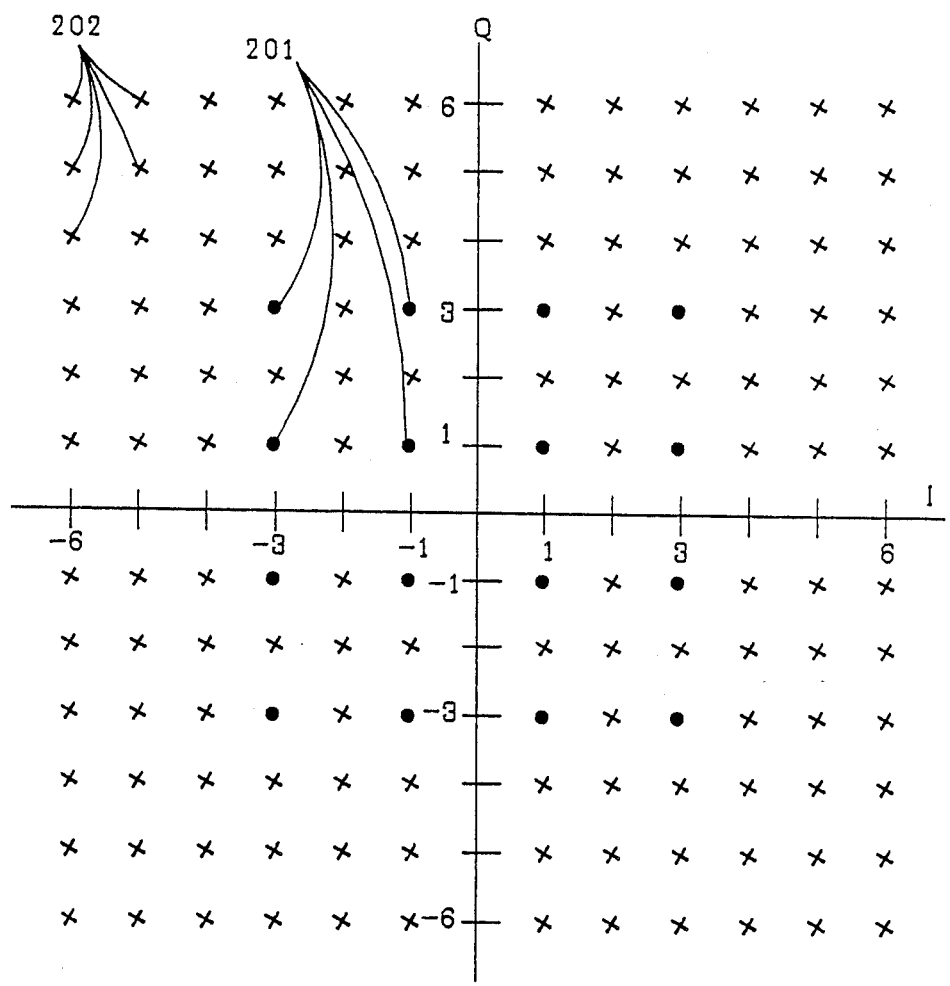
FIG. 2 is a plot of the signal space diagram of the signal levels transmitted by the communications system of FIG. 1 utilizing 16 QAM modulation.

Refer now to FIG. 2 which shows the signal space diagram for the illustrative transmitter of FIG. 1. The data signal appearing on lead 137 is designated as the "I" or in-phase data signal while the data signal appearing on lead 138 is referred to as the "Q" or quadrature data signal. As shown, the permissible values of the "I" and "Q" data signals are ±1 and ±3 volts and all possible combinations of these permissible values form 16 signal states, indicated by a dot (.) and designated as 201, in FIG. 2.

In conventional QAM communications systems, the output of summer 130 is coupled to a transmission channel which propagates the information to system receiver 11. In accordance with the present invention, a filter 103 having a roll-off factor of 0.5 is added to the transmitter to convert the double-sideband signal at the output of summer 130 into a vestigial sideband signal. This conversion reduces the bandwidth required for signal transmission. For Nyquist filters having a roll-off factor of 0.5 the bandwidth reduction is approximately 30%. The double-sideband to vestigial sideband signal conversion, however, corrupts the operation of conventional QAM receiver circuitry and additional functional capability is required in the receiver to intelligently recover the data signals. At this juncture, it should be understood that the present invention is also applicable to radio systems wherein additional circuitry is often disposed between summer 130 and the transmission channel to shift the frequency of the transmitted carriers to a higher frequency band. Moreover, the present invention is not limited to QAM systems and, indeed, may be utilized in any system which transmits a signal comprising modulated quadrature-related carriers which are modulated in phase or amplitude or some combination of phase and amplitude.

To understand the principles of the present invention, it is first necessary to consider the effects of filtering one of the sidebands of the illustrative double-sideband QAM signal and then transmitting the resulting vestigial sideband signal through a transmission channel.

The QAM signal appearing at the output of summer 130 can be expressed as a function of time s(t) with $$s(t) = i(t) \cos w_c t - q(t) \sin w_c t; \quad (1)$$

and where
$w_c$ denotes the frequency of the carrier generated by oscillator 126, and
i(t) and q(t) respectively denote the values of the I and Q data signals as a function of time.

When s(t) is passed through filter 103 with an impulse response h(t) in order to partially suppress either one of the sidebands, we can express the resulting vestigial sideband signal as $[s(t)]_{SSB}$ with $$[s(t)]_{SSB} = \tfrac{1}{2}\{i(t) + \hat{q}(t)\} \cos w_c t - \tfrac{1}{2}\{q(t) - \hat{i}(t)\} \sin w_c t, \quad (2)$$

where $\hat{i}(t)$ and $\hat{q}(t)$ are functions of i(t) and q(t), respectively.

A comparison of equation (2) with equation (1) reveals that the effect of suppressing one of the sidebands of the QAM signal of equation (1) contaminates i(t) with a function of q(t) and contaminates q(t) with a function of i(t). Consequently, the receiver of FIG. 1 must be provided with the capability of eliminating $\hat{q}(t)$ and $\hat{i}(t)$ to respectively recover i(t) and q(t).

Refer back to FIG. 1 and consider the general case where transmission channel 105 is dispersive and introduces distortion comprising intersymbol interference (ISI), cross-rail interference (X-rail ISI) and Gaussian noise (n(t)). If $[s(t)]_{SSB}$ is coupled through a conventional QAM demodulator 107, two received signals denoted as I(t) and Q(t) are formed on buses 110 and 111, respectively. The generation of I(t) and Q(t) is accomplished by extracting the quadrature-related carriers from the received signal using well-known carrier recovery techniques. The signals on buses 110 and 111 can be expressed as:

$$I(t) = [i(t) + \hat{q}(t)] + ISI + X\text{-rail } ISI + n_I(t), \quad (3)$$

and $$Q(t) = [q(t) - \hat{i}(t)] + ISI + X\text{-rail } ISI + n_Q(t), \quad (4)$$

with $n_I(t)$ and $n_Q(t)$ respectively representing the Gaussian noise introduced into i(t) and q(t).

The ISI and X-rail ISI in equations (3) and (4) can be eliminated by coupling I(t) and Q(t) through conventional transversal equalizers 112 and 113 which are configured to operate on I(t) and Q(t) as if $[i(t) + \hat{q}(t)]$ and $[q(t) - \hat{i}(t)]$ were the information signals. Advantageously, the tap-weight coefficients of equalizers 112 and 113 are adjusted to track the distortion in the transmission channel via well-known circuitry not shown. The equalized signals $I_E(t)$ and $Q_E(t)$ appearing at the output of equalizers 112 and 113 are then sampled at the baud rate, 1/T, by sampler 114. The $k^{th}$ sample, where k is any integer, can be expressed as $$I_E(kT) = [i(kT) + \hat{q}(kT)] + n_{IE}(kT) \quad (5)$$

for bus 116 and $$Q_E(kT) = [q(kT) - \hat{i}(kT)] + n_{QE}(kT) \quad (6)$$

for bus 117. The expressions $n_{IE}(kT)$ and $n_{QE}(kT)$ represent the Gaussian noise in the received signal components after equalization at the $k^{th}$ sampling time. Sampler 114 is controlled by a timing signal on lead 108 which is supplied by conventional timing recovery circuitry (not shown).

To recover the information carrying data signal values i(kT) and q(kT), $\hat{q}(kT)$ and $\hat{i}(kT)$ must be eliminated. It can be shown that $\hat{q}(kT)$ and $\hat{i}(KT)$ can only assume a limited number of values and the values are a function of the quantized values provided by D/A converters 122 and 123. The set of values for $\hat{i}(kT)$ and $\hat{q}(kT)$ for any communications system utilizing Nyquist filters and a filter 103 each having a roll-off factor of 0.5 can be expressed as $$\hat{i}(kT) = +\tfrac{1}{2}i((k-1)T) - \tfrac{1}{2}i((k+1)T) \quad (7)$$

and $$\hat{q}(kT) = +\tfrac{1}{2}q((k-1)T) - \tfrac{1}{2}q((k+1)T). \quad (8)$$

That is, $\hat{i}(t)$ at the $k^{th}$ sampling time is a function of i(t) at the (k−1) and (k+1) sampling times wherein the (k−1) and (k+1) sampling times are one sampling time immediately preceding and one sampling time immediately succeeding the $k^{th}$ sampling time, respectively.

And $\hat{q}(t)$ at the $k^{th}$ sampling time is a function of $q(t)$ at the $(k-1)$ and $(k+1)$ sampling times wherein the $(k-1)$ and $(k+1)$ sampling times are, respectively, one sampling time immediately preceding and one sampling time immediately succeeding the $k^{th}$ sampling time.

From equations (7) and (8), it follows that in the illustrative 16 QAM communication system wherein $i(t)$ and $q(t)$ each can take on the values of $\pm 1$ and $\pm 3$ volts, $\hat{i}(kT)$ and $\hat{q}(kT)$ can take on any of seven values from the set $\{0, -1, -2, -3, 1, 2, 3\}$. Therefore, at any sampling instant, kT, $I_E(kT)$ and $Q_E(kT)$ can each assume one of thirteen possible values from the set $\{-6, -5, -4, -3, -2, -1, 0, +1, +2, +3, +4, +5, +6\}$. This yields 169 possible combinations of $I_E(kT)$ and $Q_E(kT)$ at any sampling instant. Each of these 169 combinations appear in the signal space diagram of FIG. 2 as one of the 16 data points 201 or one of the 153 data points 202, the latter being indicated by an "X".

Combining equations (7) and (8) into equations (5) and (6) and ignoring Gaussian noise, we can write:

$$I_E(kT) = i(kT) + \frac{1}{2} q((k-1)T) - \frac{1}{2} q((k+1)T) \quad (9)$$

$$Q_E(kT) = q(kT) - \frac{1}{2} i((k-1)T) + \frac{1}{2} i((k+1)T) \quad (10)$$

Consider the signal on bus 116 for now, as the same arguments apply for bus 117. There are $4^3$ or 64 possible combinations of $i(kT)$, $q((k-1)T)$ and $q((k+1)T)$. These 64 combinations are shown in FIGS. 3 and 4. For $I_E(kT) = \pm 5$ or $\pm 6$, there is a unique value of $i(kT)$. However, if $I_E(kT)$ has any other value, the desired in-phase data signal, $i(kT)$, cannot be uniquely determined without knowledge of $q((k-1)T)$ and $q((k+1)T)$. If we assume that the decoding operation is working properly after start-up, than $q((k-1)T)$ is known at the $k^{th}$ sampling interval. Acquiring a proper value of $q((k-1)T)$ initially can be achieved by transmitting a predetermined sequence of I and Q data signals which yield a value of $I_E(kT)$ value equal to $\pm 6$. For this value, $q((k-1)T)$ can be uniquely determined. Accordingly, correctly decoding $I_E(kT)$ into $i(kT)$ requires a methodology of correctly determining $q((k+1)T)$, i.e., the value of the quadrature data signal one baud interval after the $k^{th}$ sampling time.

Examining FIGS. 3 and 4 it should be noted that for any $I_E(kT)$ and $q((k-1)T)$, there are only two possible values of $i(kT)$ and $q((k+1)T)$. The same, of course, is true for the received signal on bus 117. Also, note that the two possible $i(kT)$ are always adjacent symbol states (e.g., $-3, -1$, or $-1, +1$, or $+1, +3$) whereas the two possible values of $q((k+1)T)$ are always nonadjacent symbol states which straddle one intermediate symbol state. These nonadjacent symbol states are $-3, +1$ or $-1, +3$.

In order to correctly determine which of the two estimates of $q((k+1)T)$ is correct, it will be assumed that the received signals $I_E(kT)$ and $Q_E(kT)$ formed by demodulating the incoming vestigial sideband signal are correct. Then, the key to determining the correct value of $q((k+1)T)$ is to examine the set of possible values of $q((k+1)T)$ based on $I_E(kT)$ and the set of possible values of $q((k+1)T)$ based on $Q_E(kT)$. These two sets of possible values will have only one common value. This common value is the correct value of $q((k+1)T)$, given that $I_E(kT)$ and $Q_E(kT)$ are correct. Of course, once $q((k+1)T)$ is known, it can be used with the priorly known values of $I_E(kT)$ and $q((k-1)T)$ to determine $i(kT)$.

Figure 5:
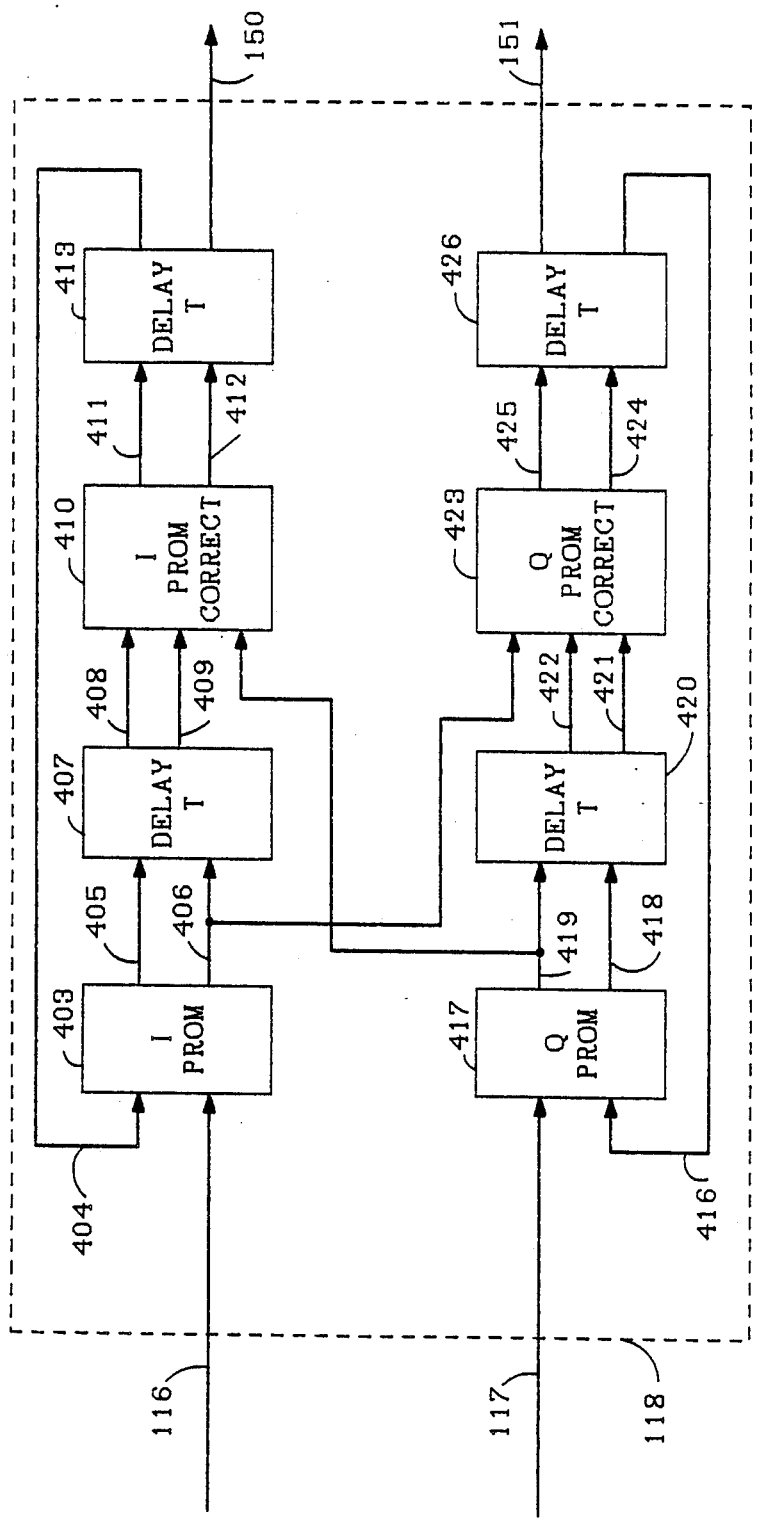
FIG. 5 is a detailed schematic diagram of an embodiment of the decoder 118 shown in FIG. 1 adapted for 16 QAM modulation.

Refer now to FIG. 5 which shows decoder 118 which utilizes the above-described methodology to correctly decode data signals $i(kT)$ and $q(kT)$ in the illustrative 16 QAM System. I PROM 403 is addressed by $I_E(kT)$ on bus 116 and $q((k-1)T)$, previously decoded by decoder 118, and appearing on bus 404. For each address, I PROM 403 reads out estimates of the correct value of $i(kT)$ and $q((k+1)T)$ on buses 406 and 405, respectively. The estimates read out for each address can be one possible value for $i(kT)$ and the associated value of $q((k+1)T)$ from FIGS. 3 and 4 for given values of $I_E(kT)$ and $q((k-1)T)$. For example, referring to FIG. 3, for $I_E(kT) = +4$ and $q((k-1)T) = +3$, a single estimate of $i(kT)$ could be $+1$ or $+3$. The associated estimate of $q((k+1)T)$ would then be $-3$ or $+1$, respectively. Or, PROM 403 can read out two symbols for each address, the first representing the possible values of $i(kT)$, e.g., $+1$ and $+3$ in the present example, and the second representing the associated values of $q((k+1)T)$, i.e., $-3$ and $+1$ in the present example. For purposes of simplicity, it will be assumed that I PROM 403 operates in this second mode.

Q PROM 417 operates in an identical manner to I PROM 403 and reads out estimates of the values of $q(kT)$ and $i((k+1)T)$ in response to each address. Each address comprises a value of $Q_E(kT)$ from bus 117 and a value of $i((k-1)T)$ from bus 416, the latter being priorly formed by decoder 118. The values of $q(kT)$ and $i((k+1)T)$ are outputted by PROM 417 onto buses 419 and 418, respectively.

To determine the correct value of the in-phase data signal at any sampling time, I PROM correct 410 is addressed by estimates of the in-phase data signal for the particular sampling time on bus 409 along with estimates of the quadrature data signal for one sampling time, or one baud interval, after the particular sampling time. Some of these estimates of the quadrature data signal are formed in response to $I_E(kT)$ and appear on bus 408 while other ones of these estimates are formed in response to $Q_E(kT)$ and appear on bus 419. Since I PROM 403 forms estimates of $i(kT)$ and $q((k+1)T)$, while Q PROM 417 forms estimates of $q(kT)$ and $i((k+1)T)$, delay element 407 is necessary to delay the output of I PROM 403 for one baud interval. This insures that the independent estimates of the quadrature data signal formed in response to $I_E(kT)$ and $Q_E(kT)$ correspond to the same sampling time.

Accordingly, for the $k^{th}$ sampling time, the address to I PROM correct comprises estimates of the in-phase data signal element at the $(k-1)^{th}$ sampling time, $i((k-1)T)$, and two estimates of the quadrature data signal element at the $k^{th}$ sampling time, $q(kT)$. The delay introduced by element 407 does not alter the decoding scheme since the estimates of the quadrature data signal element are still one baud interval after the estimate of the in-phase data signal element. For each address, I PROM correct determines the correct values of $i((k-1)T)$ and $q(kT)$ and output these values onto buses 412 and 411, respectively. Both of these signal values are delayed by one baud interval by delay element 413 before the correctly decoded in-phase data signal is coupled to bus 150 and the correctly decoded quadrature data signal is coupled to bus 404. This delay is necessary to insure that the correctly decoded quadrature data signal coupled to I PROM 403 is the quadrature data signal corresponding to one sampling time prior to the received signal on bus 116.

Q PROM correct 424 operates in an identical manner to I PROM correct 410 to determine the proper value of the quadrature data signal at any sampling time in response to estimates of the quadrature data signal at the particular sampling time on bus 422 and estimates of the in-phase data signal for one sampling time or one baud interval after the particular time. Again, some of these estimates of the quadrature data signal are formed in response to $I_E(kT)$ and appear on bus 406 while some other ones of these estimates are formed in response to $Q_E(kT)$ and appear on bus 421. Delay element 420 provides a one baud interval delay to the output of Q PROM 417 and is required to insure that the estimates of the quadrature data signal formed in response to $I_E(kT)$ and $Q_E(kT)$ correspond to the same sampling time. For each address, Q PROM correct determines the correct values of $q((k-1)T)$ and $i(kT)$ and outputs these values onto buses 425 and 424, respectively. The values on buses 425 and 424 are each delayed for one baud interval by delay element 426 before being respectively coupled to buses 151 and 416. Element 426 is required for the same synchronization reasons discussed for delay element 413.

It should be noted that I PROM correct 410 and Q PROM correct 423 each determine the correct values of the in-phase and quadrature data signals. Hence, the values on bus 404 and 151 could be compared or correlated. The same is true for the values on buses 150 and 416.

FIG. 6 summarizes the mapping function provided by I PROM 403 for given address value of $I_E(kT)$ and $q((k-1)T)$. A similar mapping can be made for Q PROM 417. For certain addresses, the output represents a single value for each signal while for other addresses the output represents a set of two values for each signal. Examples of the latter case are the outputs A, B, C, D and E, where A represents the set ({ }) of number −1, +3;
B represents {−3, +1};
C represents {−3, −1};
D represents {−1, +1}; and
E represents {+1, +3}.

FIGS. 7 and 8 summarize the mapping functions provided by I PROM CORRECT 410. A similar mapping can be made for Q PROM CORRECT 424. Note that for any input, even those representing a set of possible values, a single value for each output signal is provided. In FIGS. 7 and 8 the "X" symbol represents a don't care situation since the output signals are uniquely determined without the "X" symbol. The ? symbol represents a condition that theoretically can't occur.

Figure 9:
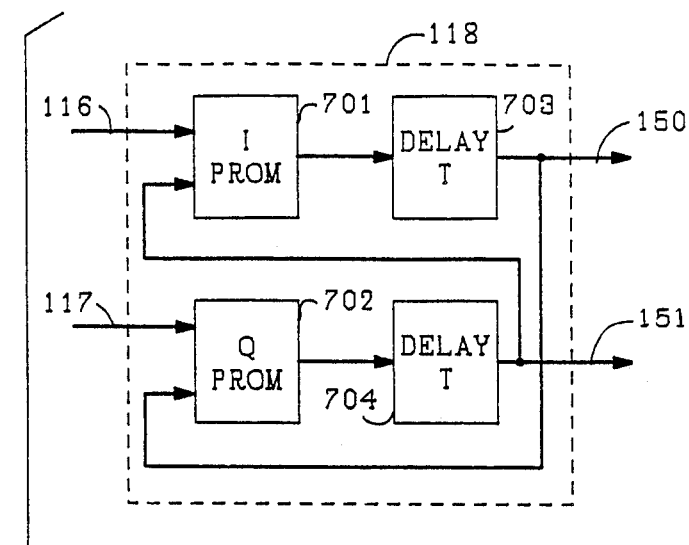
FIG. 9 is a detailed schematic diagram of another embodiment of the decoder 118 shown in FIG. 1 adapted for 4 QAM modulation.

The present invention is adaptable for use in modulation formats other than the illustrative 16 QAM format discussed above. FIG. 9 shows a decoder 118 adapted for use in a 4 QAM modulation format. In this modulation format, each of the transmitted in-phase and quadrature data signals can only assume the values of +1 or −1. All the possible combinations of $I_E(kT)$, $i(kT)$, $q((k-1)T)$ and $q((k+1)T)$ in accordance with equation (9) is also shown. It should be noted that $i(kT)$ can be uniquely determined for all $I_E(kT)$ except when $(I_E(kT))=0$. In that event, the ambiguity can be resolved using the prior decoded value of $q((k-1)T)$. As shown in FIG. 9, I PROM 701 determines $i(kT)$ in response to $I_E(kT)$ and $q((k-1)T)$ and Q PROM 702, works in identical fashion, to determine $q(kT)$ in response to $Q_E(kT)$ and $i((k-1)T)$. Delay elements 703 and 704 each provide a delay of one baud interval.

It should, of course, be understood that while the present invention has been disclosed in reference to two specific embodiments, other arrangements will be apparent to those skilled in the art without departing from the spirit and scope of the present invention. For example, the I PROM and Q PROM in FIG. 5 or 9 or the I PROM correct in FIG. 5 and Q PROM correct could be combined into a single memory unit. Moreover, while the disclosed embodiments utilize PROMS, other devices or circuitry can be used which provides the described signal mapping. Finally, the disclosed mapping can be adapted to reduce the likelihood of error propagation by outputting the more likely of several output states when the values of $I_E(kT)$ and $Q_E(kT)$ are in error.

What is claimed is:

1. A method of recovering first and second data signals from modulated quadrature-related carrier signals after said carrier signals are transformed into a vestigial sideband signal, said method comprising the steps of
    demodulating said vestigial sideband signal into first and second received signals,
    forming said first data signal at prescribed times, said first data signal at one prescribed time being in response to said second data signal at an associated prescribed time which precedes said one prescribed time and to said first received signal, and
    forming said second data signal at said prescribed times, said second data signal at said one prescribed time being in response to said first data signal at said associated prescribed time and to said second received signal.

2. A method of recovering first and second data signals which modulated quadrature-related carrier signals and wherein said carrier signals were transformed into a vestigial sideband signal which was subsequently demodulated into first and second received signals, said method comprising the steps of
    forming said first data signal at prescribed times, said first data signal formed at one prescribed time being in response to said second data signal at an associated prescribed time which precedes said one prescribed time and to said first received signal, and
    forming said second data signal at said one prescribed time in response to said first data signal at said associated prescribed time and to said second received signal.

3. Receiver apparatus comprising
    means for demodulating a vestigial sideband signal into first and second received signals, said first and second received signals being respectively associated with first and second data signals,
    means responsive to said demodulating means at a first prescribed time for forming at least one estimate of each of said first and said second data signals at a second prescribed time which succeeds said first prescribed time, and
    means responsive to said forming means for outputting said first and second data signals respectively associated with said first and second received signals at said first prescribed time.

4. The apparatus of claim 3 wherein said outputting means also forms said first and second data signals respectively associated with said first and second received signals at a third prescribed time which precedes said first prescribed time.

5. The apparatus of claim 3 wherein said forming means is also responsive to said first and second data signals respectively associated with said first and second received signals at said third prescribed time.

6. The apparatus of claim 3 wherein said forming means also forms at least one estimate of said first and said second data signals associated with said first and second received signals at said first prescribed time.

7. The apparatus of claim 3 wherein said second prescribed time immediately succeeds said first prescribed time.

8. The apparatus of claim 4 wherein said third prescribed time immediately precedes said first prescribed time.

9. The apparatus of claim 4 wherein said forming means forms said estimate of said first data signal in response to said second received signal at the first prescribed time and said estimate of said second data signal in response to said first received signal at the first prescribed time.

10. The apparatus of claim 3 wherein said forming means comprises a memory.

11. The apparatus of claim 3 wherein said outputting means comprises a memory.

12. The apparatus of claim 3 wherein said forming means includes a sampler.

13. Receiver apparatus for recovering first and second data signals from first and second received signals, the latter two signals being formed by demodulating a vestigial sideband signal, said apparatus comprising
means responsive to said first and second received signals at a first prescribed time for forming at least one estimate of each of said first and second data signals at a second prescribed time which succeeds said first prescribed time, and
means responsive to said forming means for outputting said first and second data signal associated with said first and second received signals at said first prescribed time.

14. A method of recovering first and second data signals from modulated quadrature-related carrier signals after said carrier signals are transformed into a vestigial sideband signal, said method comprising the steps of:
demodulating said vestigial sideband signal into first and second received signals, said first and second received signals being respectively associated with said first and second data signals,
forming, in response to said first and second received signals at a first prescribed time, at least one estimate of each of said first and second data signals at a second prescribed time which succeeds said first prescribed time, and
outputting said first and second data signals at said first prescribed time in response to said estimates of said first and second data signals.

15. A method of recovering first and second data signals which modulated quadrature-related carrier signals and wherein said carrier signals were transformed into a vestigial sideband signal which was subsequently demodulated into first and second received signals, said method comprising the steps of:
forming, in response to said first and second received signals at a first prescribed time, at least one estimate of each of said first and second data signals at a second prescribed time which succeeds said first prescribed time, and
outputting said first and second data signals at said first prescribed time in response to said formed estimates.

* * * * *